United States Patent [19]

Hayashi

[11] Patent Number: 4,667,588
[45] Date of Patent: May 26, 1987

[54] METHOD OF PRODUCING CRACKERS AND APPARATUS FOR CARRYING OUT THE SAME

[75] Inventor: Yoshikazu Hayashi, Tokyo, Japan

[73] Assignee: Kabushiki Kaisha Airin, Okazuki, Japan

[21] Appl. No.: 780,003

[22] Filed: Sep. 25, 1985

[30] Foreign Application Priority Data

Oct. 16, 1984 [JP] Japan .................. 59-216568

[51] Int. Cl.⁴ .............................. A47J 37/01
[52] U.S. Cl. ...................... 99/372; 425/256; 425/260; 99/427
[58] Field of Search ............ 99/323.4, 426, 427, 99/372, 483, 485; 426/512; 425/256, 257, 258, 260

[56] References Cited

U.S. PATENT DOCUMENTS

3,832,107  8/1974  Cox ....................... 425/258
3,949,660  4/1976  Kuhlman .................. 99/372

Primary Examiner—Robert W. Jenkins
Attorney, Agent, or Firm—Martin Smolowitz

[57] ABSTRACT

A method of producing a cracker from a raw material such as grain such as unhulled rice, or artificial rice, composite raw material formed in a chip-shape, or the like is disclosed. It comprises steps of compressing and heating for a predetermined time the raw material already processed to some extent to advance and contained within a hermetically closed chamber defined in upper and lower baking molds heated, moving instantaneously the upper mold finely up and down to spread the raw material on a bottom surface of the lower baking mold, and in the foregoing state, compressing and heating the raw material again, and expanding instantaneously the compressed and heated raw material at a time when the upper baking mold starts moving upwardly to remove the compression, thereby shaping the material in a cracker of a desired form in a self-sustaining structure. An apparatus for carrying out the method is also disclosed.

5 Claims, 8 Drawing Figures

METHOD OF PRODUCING CRACKERS AND APPARATUS FOR CARRYING OUT THE SAME

BACKGROUND OF THE INVENTION

1. Field of the Invention

The present invention relates to a method of producing a cracker or the like from a raw material such as grain such as unhulled rice or the like, or artificial rice, starch or the like mixed with desired raw materials such as cheese, tiny fish, shrimp, vegetable or the like and formed in a chip-shape. The invention also relates to an apparatus for carrying out the method.

2. Description of the Prior art

Heretofore, cracker-type foods produced from such raw materials as rice, soybean, corn or the like have been liked by many people as nourishing natural foods. In the known method for producing this type of foods, a raw material already processed in advance to have a predetermined water content is fed into heated and air-tight chamber defined in upper and lower baking molds, compressed and heated therein. Thereafter, upon lapse of a predetermined time, the upper or the lower baking mold is vertically moved to remove the compression. As a result, the raw material is caused to expand instantaneously to form a cracker of a self-sustaining structure.

In the known method set forth above, vertical movement of the upper and lower baking molds, or sliding movement of a slide plate for feeding the raw material into the lower baking mold is performed by actuation of an air cylinder. However, employment of the air cylinder has the disadvantage that even a slight change of air quantity fed from a compressor delicately changes the movement of, inter alia, the upper and the lower baking molds, resulting in too large or too small compression on the raw material. As a result, baking conditions for the raw material are changed. In addition, due to change of removing speed of the compression, etc., the thickness of the expanded crackers cannot be made uniformly, which badly spoils a production value thereof. Furthermore, actuation of the air cylinder requires installation of a compressor. Accordingly, an assembly of such apparatus as a whole is required to be made large. Moreover, structure thereof becomes complicated due to arrangement of electric circuits, installation of various kinds of valves, connection of air hoses, etc. The complicated structure often brings about mechanical troubles. A consideration is also made to employ a hydraulic cylinder instead of the air cylinder. However, the hydraulic cylinder assembly itself is bulky and expensive. Besides, the hydraulic cylinder possesses such fundamental disadvantages as that it cannot reverse the direction of movement while it is in the process of advancing or retreating movement, nor can it advance or retreat instantaneously. Accordingly, the hydraulic cylinder is not desirable for practical use for a cracker producing apparatus, in which delicate actuation and movement of component parts thereof are required.

The present invention has been accomplished in order to solve the above mentioned problems inherent in the prior art.

SUMMARY OF THE INVENTION

It is therefore a general object of the present invention to provide a method of producing a cracker and an apparatus for carrying out the same, wherein a cam plate is employed to mechanically control the production of a cracker without using an air cylinder, so that movement of baking molds can be accurately controlled in order to uniformly make the thickness of the cracker, high product value of the finished cracker can be obtained, an assembly of the apparatus as a whole can be made small and simple, and which therefore is hardly susceptible to trouble.

In order to achieve the above object, there is essentially provided a method of producing a cracker from a raw material such as grain such as unhulled rice, or artificial rice, composite raw material formed in a chip-shape, or the like comprising steps of compressing and heating for a predetermined time the raw material already processed to some extent in advance and contained within a hermetically closed chamber defined in upper and lower baking molds heated, moving instantaneously the upper mold finely up and down to spread the raw material on a bottom surface of the lower baking mold, and in the foregoing state, compressing and heating the raw material again, and expanding instantaneously the compressed and heated raw material at a time when the upper baking mold starts moving upwardly to remove the compression, thereby shaping the material in a cracker of a desired form in a self-sustaining structure.

There is also essentially provided an apparatus for producing a cracker from a raw material such as grain such as unhulled rice, or artificial rice, composite raw material formed in a chip-shape, or the like comprising a lower baking mold adapted to be heated by a heater and moved upwardly, an upper baking mold adapted to be moved upwardly and downwardly relative to the lower baking mold and received within the lower baking mold in an air-tight manner at a time when the upper baking mold is moved downwardly, the upper baking mold being also adapted to be heated by the heater and a slidable feeding plate formed with a quantative hole for transporting a predetermined quantity of the raw material contained in a hopper to the lower baking mold, the feeding plate being adapted to serve both for pushing outwardly a shaped and self-sustaining cracker from the lower baking mold and for feeding the predetermined quantity of raw material into the lower mold through the quantative hole when the upper baking mold is at a lifted position, the upper and the lower baking molds, and the feeding plate being actuated by means of rotation of respective cam plates each provided thereon.

The function of the apparatus according to the present invention is as follows. The rotation of respective cam plates coaxially mounted on a driving shaft causes an upper baking mold to move upwardly which in turn causes a feeding plate to move forwardly for feeding a predetermined quantity of a raw material onto a lower baking mold. Upon completion of the feeding of the raw material onto the lower baking mold, the feeding plate is moved backwardly. Thereafter, the upper baking mold is moved downwardly to be received in the lower baking mold in an air-tight manner, and the raw material within the baking molds is compressed and heated. At a time when the upper baking mold starts moving upwardly after a lapse of a predetermined time, the raw material is expanded and formed into a self-sustaining structure within a chamber defined in the upper and the lower baking molds. In this way, the discharging of the rice cracker on the lower baking mold and the feeding of the raw material are carried out by the forward movement of the feeding plate caused by the upward movement of the upper baking mold. This feeding and discharging process is repeated in the manner described.

BRIEF DESCRIPTION OF THE DRAWINGS

While the present invention is particularly pointed out and distinctly claimed in the concluding portions herein, a preferred embodiment is set forth in the following detailed description which may be best understood when read in connection with the accompanying drawings, in which:

DETAILED DESCRIPTION OF THE EMBODIMENTS

A preferred embodiment of the present invention will be described hereunder with reference to the accompanying drawings.

Figure 1:
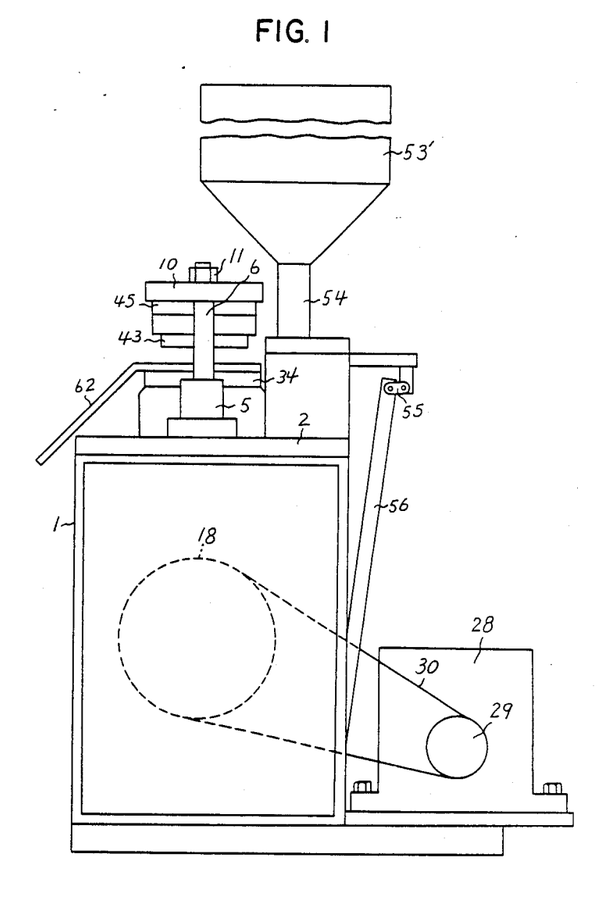
FIG. 1 is a front view of a cracker producing apparatus according to a preferred embodiment of the present invention.
Figure 2:
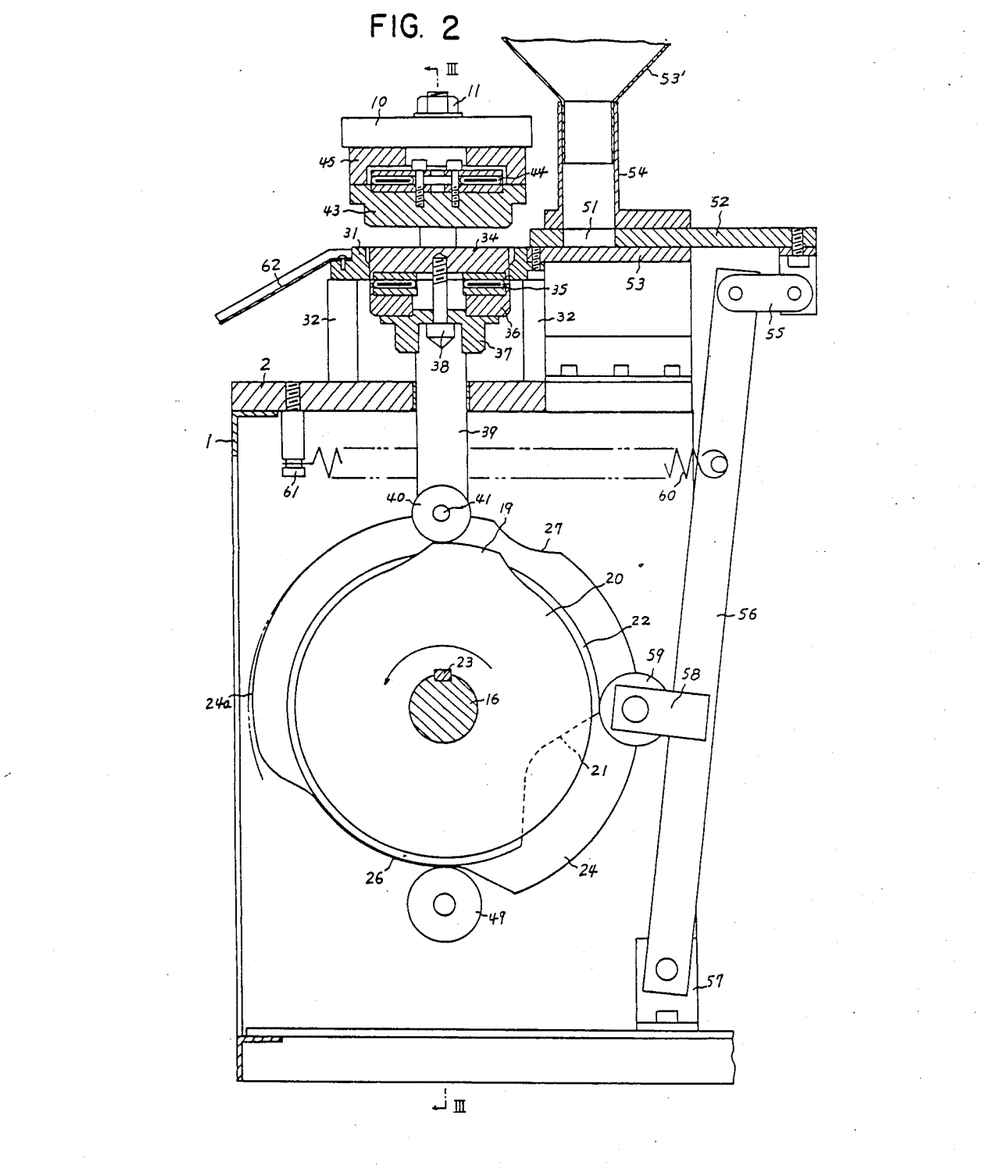
FIG. 2 is a sectional view showing relations among cam plates, baking molds and a feeding plate.
Figure 3:
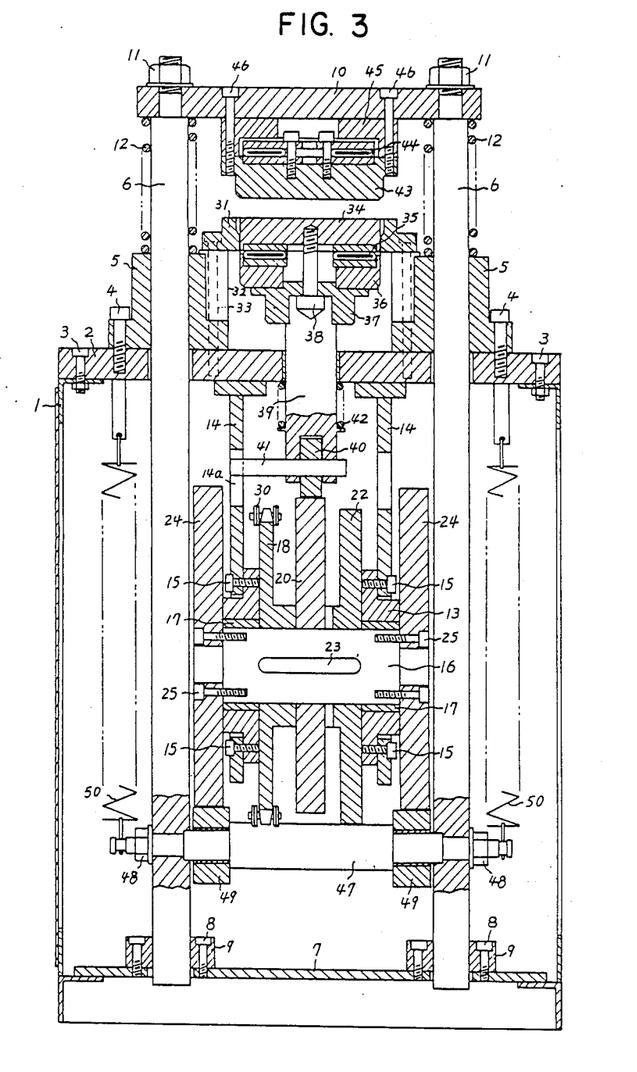
FIG. 3 is a sectional view taken on line III—III of FIG. 2.

FIGS. 1 through 3 illustrates one embodiment of a cracker producing apparatus according to the present invention. In FIG. 1, reference numeral 1 denotes a box-like frame, on which a table 2 is fixedly secured by bolts 3. A pair of rods 6 are vertically movably supported at right angles on the top of the frame 1 through an upper guide bush 5 spacedly fixed to the latter by bolts 4. The lower ends of the rods 6 are supported by a lower guide bush 9 fixed to a bottom plate 7 of the frame 1. The upper ends of the rods 6 are connected to a plate 10 secured by nuts 11. Stretched between the guide bush 5 and the plate 10 is a coil spring 12 for suspending the rods 6. Reference numeral 13 denotes a bearing fixedly secured by bolts 15 to a bracket 14 hanging down from the box-like frame 1 between the rods 6, 6. Horizontally supported through a metal 17 by the bearing 13 is a rotatable shaft 16. Mounted in parallel by a key 23 on the rotatable shaft 16 are a sprocket 18, a first cam plate 20 having a protruded portion 19 with an expanded diameter at its outer peripheral surface, and a second cam plate 22 having a notch 21 formed in a part of its outer peripheral surface. On the other hand, an outer end of the rotatable shaft 16 is axially attached with a pair of third cam plates 24 by bolts 25. Each of the cam plates 24 is formed at a part of its outer peripheral surface with a first notch 26 having a reduced diameter of a concentric circle shape, and a second notch 27 of an arcuate shape formed in the outer peripheral surface at the opposite side (at 180° angle) of the notch 26. A rotating rear portion of the first notch 26 reaches to the outer peripheral surface via a gentle gradient surface 24a. The rotatable shaft 16 is rotated in the counter clockwise direction in FIG. 1 driven by a chain 30 looped around the sprocket 18 and an output shaft 29 of a motor 28 with a speed reducer.

Reference numeral 31 denotes a side mold fixedly secured onto the table 2 between the rods 6, 6 by bolts 33 through a spacer 32. Disposed on a bottom portion of the side mold 31 is a lower baking mold 34 which is adapted to move upwardly. The under surface of the lower baking mold 34 is connected with a protecting plate 37 by bolts 38 through a heater 35 and a heat insulating spacer 36. Supported by an axial pin 41 on the lower end of an axial rod 39 threadedly engaged with the protecting plate 37 and loosely penetrating the table 2 is a roller 40 for abutting against the outer peripheral surface of the first cam plate 20. The pin 41 is extended at its one end, and the extended portion thereof is inserted in a vertically elongated hole 14a formed in the bracket 14, so that rotation of the lower baking mold 34 is prevented. Due to the foregoing arrangement, when the roller 40 is caused to ride over onto the protruded portion 19 formed on the first cam plate 20, the lower baking mold 34 is moved up to the same level of the upper surface of the side mold 31. Reference numeral 42 denotes a spring adapted to energize the roller 40 to the first cam plate 20. Reference numeral 43 denotes an upper baking mold disposed above and in opposite to the lower baking mold 34. The upper baking mold 43 is fixedly secured to the plate 10 by bolts 46 through a heater 44 and a heat insulated spacer 45. On the other hand, connected by a nut 48 to a lower portion of each of the rods 6, 6 is an axial rod 47. A roller 49 axially attached to the axial rod 47 is abutted against the outer peripheral surface of each of the pair of third cam plates 24. Due to the foregoing arrangement, when the roller 49 is engaged in the first notch 26 formed in the third cam plate 24, the upper baking mold 43 is moved downwardly into the side mold 31, so that a chamber closed in an air-tight manner is defined in cooperation with the lower baking mold 34. Reference numeral 50 denotes a coil spring for energizing the roller 49 toward the third cam plate 24.

A feeding plate 52 having a quantative hole 51 formed therein is disposed on a receiving plate 53 on the same level of the side mold 31. The feeding plate 52 is reciprocally movable with respect to the lower baking mold 34. Disposed above the feeding plate 52 is a conduit 54 of a hopper 53'. The quantative hole 51 formed in the feeding plate 52 is brought to be in alignment with the conduit 54 when the feeding plate 52 is moved backwardly. Connected to the feeding plate 52 through a link 55 is one end of an arm plate 56. The other end of the arm plate 56 is connected to a fulcrum plate 57 disposed on the bottom plate 7 of the box-like frame 1. Disposed at an intermediate portion of the arm plate 56 is a roller 59 supported thereon through a side plate 58. The roller 59 is abutted against the outer peripheral surface of the cam plate 22. Reference numeral 60 denotes a spring stretched between the arm plate 56 and the pin 61. The spring 60 is adapted to normally energize the roller 59 toward the second cam plate 22.

Next, description will be made on a method of producing crackers by using the apparatus of the present invention. The raw material or uncleaned rice for producing a rice cracker may be prepared by mixing together some quantity of unhulled or brown rice of more than two kinds or brands, for example. The rice mixture is then cleaned by a rice washing machine for about 5 to 7 minutes and received in a basket to be left for about 15 to 20 minutes for removing water. Then, a predetermined quantity of salt is added to the dewatered unhulled rice to be intimately mixed therewith. Thereafter, the raw material is preparatorily dried for a full day and night and then subjected to a primary drying process in a drying machine for about two to three hours at a normal temperature. After having been dried, the raw rice mixture is loaded in the hopper 53'. An appropriate quantity of laver or sesame seeds, if desired, may be added to the unhulled rice after the rice has been primarily dried. Water content of the dried rice mixture provides a meaningful factor for carrying out the present invention. The water content should be in the range of from 10% to 20%, and more preferably in a range of from 14% to 18%. By the way, the water content is about 15% to 16% before the washing and about 30% immediately after the washing.

Figure 6:
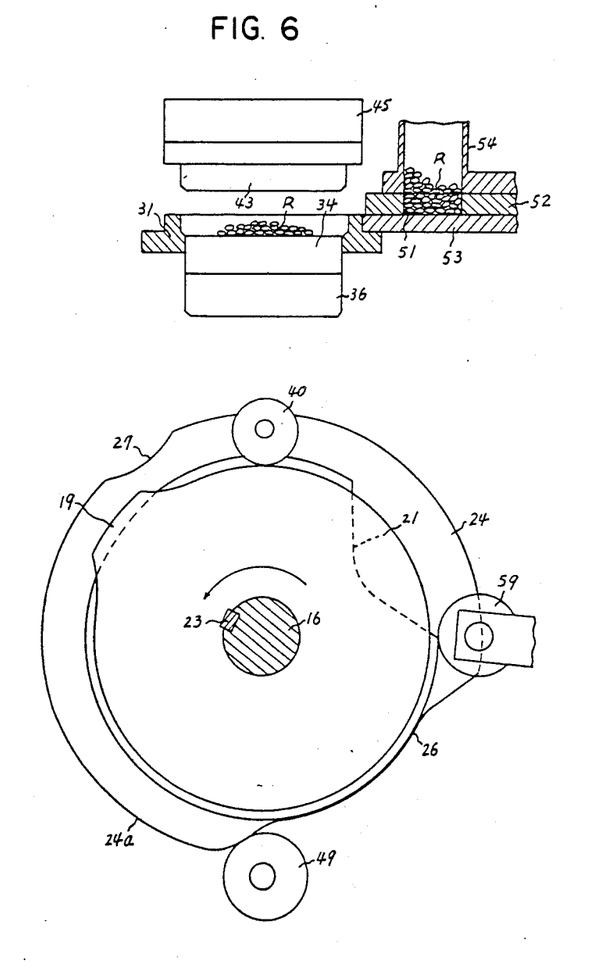

The raw rice mixture or unhulled rice loaded in the hopper 53' reaches to the quantative hole 51 formed in the feeding plate 52 through the conduit 54. The lower and the upper baking molds 34 and 43 are heated up to a temperature in a range of from 150° C. to 240° C. by the heaters 35 and 44 respectively before the apparatus is operated. More preferably, they are heated up to about 220° C. At this time, as shown in FIG. 2, the feeding plate 52 is withdrawn rearwardly with the roller 59 abutted against the outer peripheral surface of the second cam plate 11. The lower baking mold 34 is moved upwardly to the same level of the side mold 31 with the roller 40 ridden over onto the protruded portion 19 of the first cam plate 20. On the other hand, the upper baking mold 43 is moved upwardly with the roller 49 fallen into the first notch 26 formed in the third cam plate 24. In the foregoing state, when the respective cam plates 20, 22 and 24 are simultaneously rotated in the counter clockwise direction due to rotation of the rotatable shaft 16, the roller 59 starts falling into the notch 21 formed in the second cam plate 22 to cause the feeding plate 52 to move forwardly (leftward movement). As soon as the roller 59 reaches the bottom portion of the notch 21 to cause the feeding plate 52 to be advanced to its foremost position with the quantative hole 51 brought to be in the central portion of the lower baking mold 34 (see FIG. 5), the roller 40 starts falling from the protruding portion 19 of the first cam plate 20. As a result, the lower baking mold 34 is moved downwardly. Thus, the unhulled rice mixture R within the quantative hole 51 is fed to the intermediate portion of the lower baking mold. Likewise, when the roller 59 rides over onto the outer peripheral surface of the second cam plate 22 from the notch 21, the feeding plate 52 is caused to be completely withdrawn backwardly and waits for the next operation with the unhulled rice mixture for the next operation already fed into the quantative hole 51 (see FIG. 6).

Figure 7:
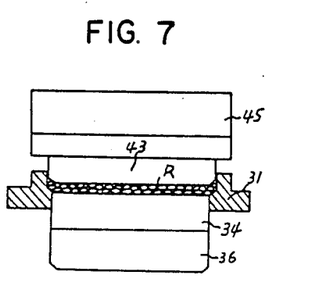
Figure 8:
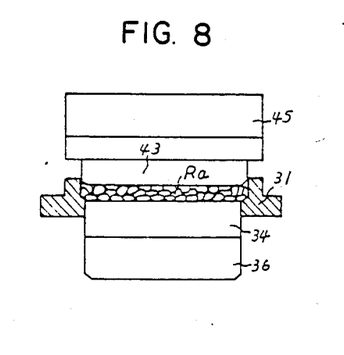

In accordance with the withdrawing motion of the feeding plate 52, the roller 49 starts the riding-over motion from the first notch 26 formed in the third cam plate 24. Accordingly, the upper baking mold 43 starts moving downwardly to engage in the side mold 31, thereby defining a chamber in an air tight manner among the upper and the lower baking molds 34 and 43, and the side mold 31. Before long, the roller 49 which has just completed the riding-over from the first notch 26 moves slowly on the gentle gradient surface 24a and reaches the outer peripheral surface of the third cam plate 24. In the meantime, the upper baking mold 43 is gradually moved downward to compress and heat the unhulled rice mixture R (see FIG. 7) due to the movement of the roller 49 just described. The unhulled rice mixture R is compressed and heated for a few seconds. During the foregoing process, the roller 49 which moved on the outer peripheral surface of the third cam plate 24 is fallen into the second notch 27. Accordingly, the upper baking mold 43 is instantaneously finely moved up and down to scatter compressed gas within the chamber defined in the upper and lower baking mods 34 and 43, and the side mold 31. By this, the baked unhulled rice mixture R is dispersed and uniformly spread on the lower baking mold 34. In this state, the unhulled rice mixture R is kept subject to the compression and the baking. At a time when the unhulled rice mixture R has been completely heated, the roller 49 starts falling into the first notch 26. The foregoing movement of the roller 49 causes the upper baking mold 43 to resume its upward movement and remove the compression on the unhulled rice mixture R. At this moment, the unhulled rice mixture R is instantaneously expanded to form a rice cracker Ra of a self-sustaining structure within the chamber defined in the baking molds 34 and 43 (see FIG. 8). Thereafter, in accordance with the upward movement of the upper baking mold 43, the roller 40 rises over onto the protruded portion 19 formed on the first cam plate 20. Accordingly, the lower baking mold 34 is also moved upwardly. The lower and the upper baking molds 34 and 43 are now returned to the state as shown in FIG. 3, and the feeding plate 52 starts moving forwardly again as described. By the way, the rice cracker Ra on the lower baking mold 34 is pushed outwardly due to the forward movement of the feeding plate 52 and received in a container (not shown) through a shute 62.

Figures 4, 5:
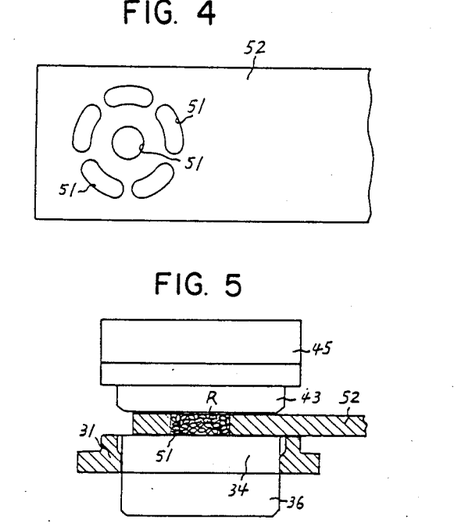
FIG. 4 is a plan view of an embodiment of a quantitative hole formed in the feeding plate.
FIGS. 5 through 8 are schematic views showing the relation between the baking molds and the cam plates for explaining the movement thereof.

Although a single quantative hole 51 of an annular shape is formed in the feeding plate 52 in the above mentioned embodiment, the quantative hole 51 may be formed in a plurality of holes scattered as shown in FIG. 4, so that the unhulled rice mixture R can be evenly spread on the lower baking mold 34 when fed thereto. By this, a rice cracker having a uniform thickness can be produced. Preferably, the scattered holes are formed in a floral shape as shown in FIG. 4.

In the above embodiment, an unhulled rice is used as a raw material of a cracker. However, the raw material is not limited to the unhulled rice. Alternatively, power of other grains than the unhulled rice, vegetables, fishes, or the like mixed with starch, grain power or the like may be processed into a granular-form to be used as the raw material for producing a rice cracker natural and soft to the teeth and having a high nutritive value.

As described in the foregoing, in an apparatus for producing a rice cracker according to the present invention, the motion of the upper and the lower baking molds and the feeding plate of the raw material is operated by mechanical means by a cam plate without using an air cylinder. Due to the foregoing arrangement, the motion of the component parts can be controlled accurately. The result is that a cracker having a uniform thickness and therefore of a high product value can be obtained. Furthermore, by adequately modifying the shape of the notch formed in the cam plate for actuating the upper baking mold, thickness of the resultant cracker can be changed according to necessity. Since the apparatus can be made small in size and light in weight, it can be installed even in a limited space. Finally, the apparatus is appealing because of its simple construction, which is therefore hardly susceptible to trouble and inexpensive to manufacture.

While particular embodiments of this invention have been shown in the drawings and described above, it will be apparent, that many changes may be made in the form, arrangement and positioning of the various elements of the combination. In consideration thereof, it should be understood that preferred embodiments of this invention disclosed herein are intended to be illustrative only and not limited the scope of the invention.

What is claimed is:

1. An apparatus for producing a cracker from a raw material such as grain or composite raw material formed in a chip-shape or the like, comprising:

a lower baking mold adapted to be heated by a heater and moved upwardly, said lower baking mole being encircled by a concentric mold so as to provide a cavity therein;

an upper baking mold adapted to be moved upwardly and downwardly relative to said lower baking mold and received within said cavity provided by said lower baking mold and said concentric mold in an air-tight manner at a time when the upper baking mold is moved downwardly, said upper baking mold being also adapted to be heated by a heater; and a slidable feeding plate formed with a quantative hole for transporting a predetermined quantity of said raw material contained in a hopper to said lower baking mold, said feeding plate being adapted to serve both for pushing outwardly a shaped and self-sustaining cracker from said lower baking mold and for feeding said predetermined quantity of raw material into said lower mold through said quantative hole when said upper baking mold is at a lifted position, said upper and said lower baking molds and said feeding plate each being moved by means of respective rotary cam plates each slidably contacting the lower baking mold, the upper baking mold, and the slidable feed plate.

2. An apparatus according to claim 1, wherein said quantative hole formed in said feeding plate comprises a plurality of holes scattered.

3. An apparatus according to claim 1, wherein said cam plates include a first cam plate slidably contacting said lower baking mold, a second cam plate slidably contacting said feeding plate; and a pair of third cam plates slidably engaging said upper baking mold.

4. An apparatus according to claim 1, wherein said cam plates are mounted on a common rotatable shaft.

5. An apparatus for producing a cracker from a raw material such as grain or composite raw material formed in a chip-shape or the like, comprising:

a lower baking mold adapted to be heated by a heater and moved upwardly, said lower baking mold being encircled by a concentric mold so as to provide a cavity therein;

an upper baking mold adapted to be moved upwardly and downwardly relative to said lower baking mold and received within said cavity provided by said lower baking mold and said concentric mold in an air-tight manner at a time when the upper baking mold is moved downwardly, said upper baking mold being also adapted to be heated by a heater; and a slidable feeding plate formed with a quantative hole for transporting a predetermined quantity of said raw material contained in a hopper to said lower baking mold, said feeding plate being adapted to serve both for pushing outwardly a shaped and self-sustaining cracker from said lower baking mold and for feeding said predetermined quantity of raw material into said lower mold through said quantative hole when said upper baking mold is at a lifted position, said upper and said lower baking molds and said feeding plate each being moved by means of respective rotary cam plates each slidably contacting the lower baking mold, the upper baking mold, and the slidable feed plate, said cam plates being mounted on a common rotatable shaft mounted in a frame below said lower baking mold.

* * * * *